(12) United States Patent
Hartley et al.

(10) Patent No.: US 9,812,098 B2
(45) Date of Patent: Nov. 7, 2017

(54) NANO-POLYMER BONDED MUSICAL INSTRUMENT STRING

(71) Applicants: Bryan Hartley, Novato, CA (US); Theresa Lambert, Santa Rosa, CA (US); Jasmin Powell, Benicia, CA (US)

(72) Inventors: Bryan Hartley, Novato, CA (US); Theresa Lambert, Santa Rosa, CA (US); Jasmin Powell, Benicia, CA (US)

(73) Assignee: Dunlop Manufacturing, Inc., Benicia, CA (US)

(*) Notice: Subject to any disclaimer, the term of this patent is extended or adjusted under 35 U.S.C. 154(b) by 0 days.

(21) Appl. No.: 14/838,078

(22) Filed: Aug. 27, 2015

(65) Prior Publication Data

US 2017/0061939 A1    Mar. 2, 2017

(51) Int. Cl.
| C09D 5/08 | (2006.01) |
| G10D 3/10 | (2006.01) |
| C09D 183/04 | (2006.01) |
| G10D 1/00 | (2006.01) |
| B82Y 30/00 | (2011.01) |

(52) U.S. Cl.
CPC ................. *G10D 3/10* (2013.01); *C09D 5/08* (2013.01); *C09D 183/04* (2013.01); *G10D 1/005* (2013.01); *B82Y 30/00* (2013.01)

(58) Field of Classification Search
CPC ........... G10D 3/143; G10D 1/00; B05D 3/007
USPC ............................................. 84/297 S, 297 R
See application file for complete search history.

(56) References Cited

U.S. PATENT DOCUMENTS

| 4,911,075 | A * | 3/1990 | Lewis | B41C 1/04 101/453 |
| 6,765,136 | B2 * | 7/2004 | Van Pamel | G10D 3/10 84/297 R |
| 2009/0158912 | A1 * | 6/2009 | Nesbitt | B05D 3/007 84/297 S |
| 2012/0237767 | A1 * | 9/2012 | Yaniv | D07B 1/162 428/377 |
| 2015/0269917 | A1 * | 9/2015 | Zwieg | G10D 3/10 84/297 S |

* cited by examiner

*Primary Examiner* — Kimberly Lockett
(74) *Attorney, Agent, or Firm* — West & Associates, A PC; Stuart West (57) ABSTRACT

A musical instrument string covalently and/or ionically bonded with a nano-polymer substance. The nano-polymer substance can be hydrophobic and/or oleophobic, such that it can substantially repel water and/or oils and thereby prevent corrosion, oxidation, and/or other degradation of the musical instrument string. The bonding of the nano-polymer substance to the musical instrument string can also improve the musical instrument string's tone.

18 Claims, 6 Drawing Sheets

NANO-POLYMER BONDED MUSICAL INSTRUMENT STRING

BACKGROUND

Field of the Invention

The present disclosure relates to coated musical instrument strings, particularly a musical instrument string bonded with a nano-polymer substance.

Background

Untreated musical instrument strings often degrade in quality over time. For example, metal musical instrument strings can become oxidized and/or corroded after coming in contact with agents such as oils, salts, and moisture from human hands, the surrounding air, or any other source.

To protect against such oxidation and corrosion, musical instrument strings are often coated with protective substances. For instance, musical instrument strings are often coated with polymers such as polytetrafluoroethylene (PTFE) or ethylene tetrafluoroethylene (ETFE). Such coatings can resist picking up moisture, oils and other corrosive agents from a player's fingers and the general environment, and can provide a barrier that keeps such corrosive agents from contacting the string under the coating. However, moisture and oils can still accumulate over time on polymer-coated musical instrument strings, which can eventually degrade the musical instrument strings. Additionally, such coatings can wear or peel off over time, leaving the string at least partially exposed.

In some situations, coating a musical instrument string can alter its sound. For example, coating a musical instrument string can change its structural qualities enough to alter the way it vibrates, thereby changing its pitch. In some cases, coating a musical instrument string with conventional polymers can result in a relatively thick outer layer of polymer that can muffle the sounds produced by the musical instrument string.

Recently, nano-polymer substances have been developed that are hydrophobic and/or oleophobic. Such nano-polymer substances can substantially repel water and/or oils. As such, surfaces coated and/or bonded with nano-polymer substances can be protected from corrosive or oxidizing agents more than surfaces coated with conventional polymer coatings.

What is needed is a musical instrument string bonded with a nano-polymer substance. A nano-polymer bonded musical instrument string can be protected from oxidation, corrosion, and/or other degradation to a greater degree than conventionally coated strings. A nano-polymer bonded musical instrument string can also provide a different or improved sound when played on a musical instrument compared to conventionally coated and/or uncoated strings, as the nano-polymer substance can covalently and ionically bond with the string. As such, a nano-polymer bonded musical instrument string can avoid the muffling effects of a thicker layer of polymer coating.

DETAILED DESCRIPTION

Figure 1:
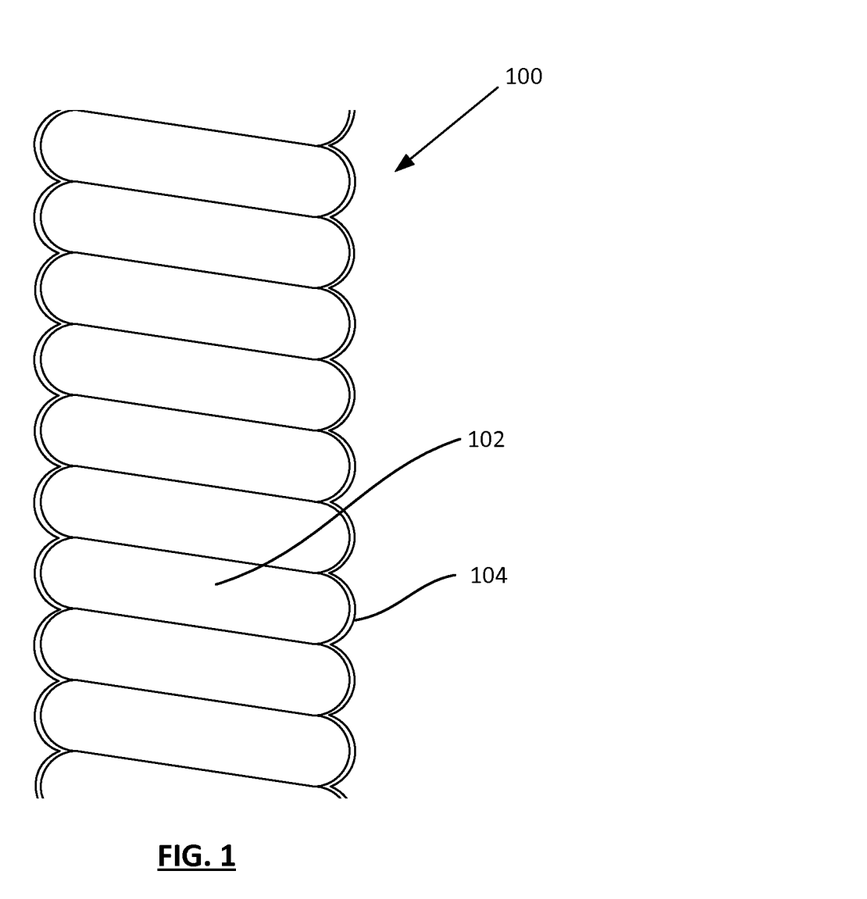
FIG. 1 depicts a portion of an exemplary embodiment of a nano-polymer bonded musical instrument string.

FIG. 1 depicts a close-up view of a portion of a nano-polymer bonded musical instrument string 100. A nano-polymer bonded musical instrument string 100 can comprise a string 102 and a nano-polymer substance 104 bonded with one or more components of the string 102.

Figure 2:
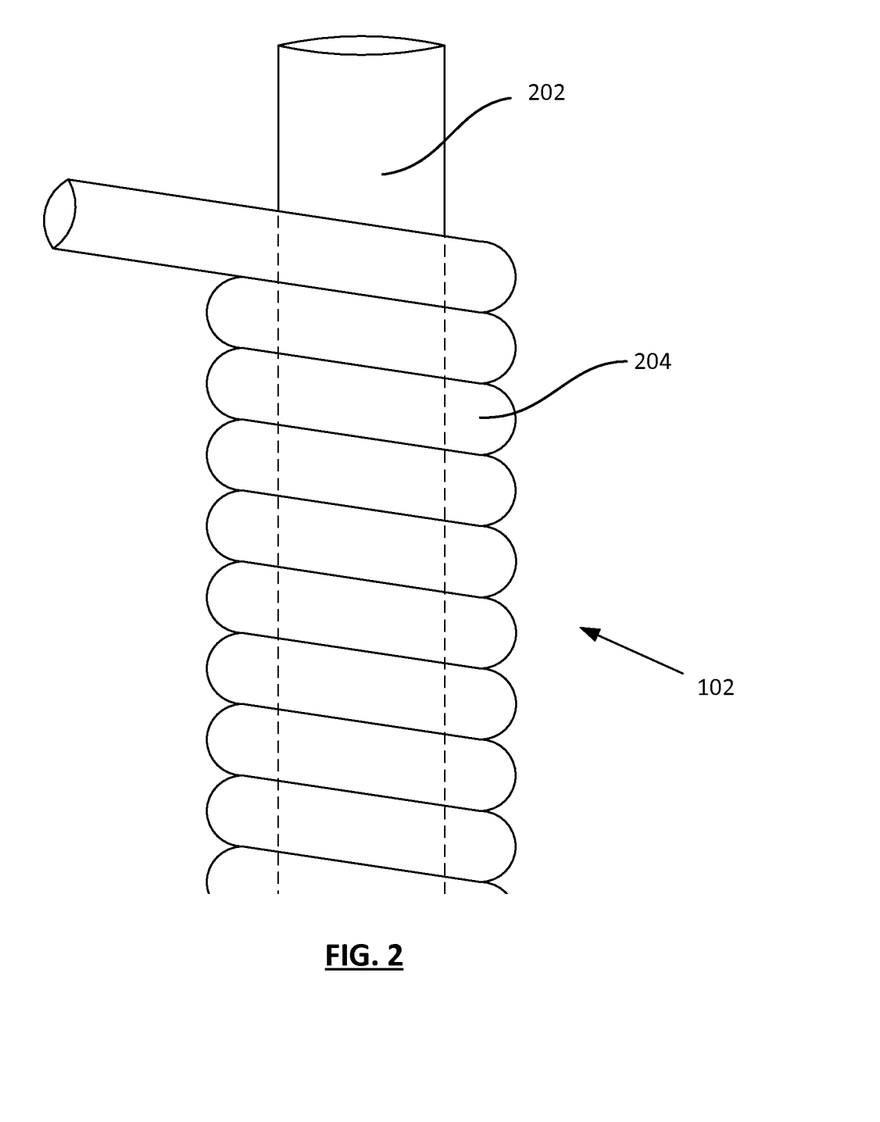
FIG. 2 depicts a cross-section of a portion of an embodiment of a wound string.

As shown in FIG. 2, in some embodiments the string 102 can be a wound string comprising a core string 202 and a wrap string 204 wound around the core string 202 in a spiral pattern. In alternate embodiments, the string 102 can be an unwrapped length of metal, metal alloy, metal-plated alloy, or any other material, such as a length of nickel or steel. A string 102 can be manufactured to have any desired diameter to form any desired gauge, such as any of the gauges commonly used for the strings of musical instruments such as guitars or other fretted instruments.

In embodiments in which the string 102 is a wound string, its core string 202 can be a length of string, wire, or any other elongated member. In some embodiments the core string 202 can be made of metal, metal alloy, or metal-plated alloy, such as steel or brass. In other embodiments the core string 202 can be made of natural materials such as silk or gut, or synthetic materials such as nylon. In some embodiments the core string 202 can have a circular cross-section. In other embodiments the core string 202 can have polygonal cross-section, such as a hexagonal cross-section.

A wound string's wrap string 204 can be a length of string, wire, or any other elongated member that is wound or wrapped around the core string 202. In some embodiments the wrap string 204 can be made of metal, metal alloy, or metal-plated alloy, such as bronze, aluminum, silver, gold, stainless steel, nickel, chrome steel, nickel-plated steel, cobalt, brass, copper, tin, and/or tungsten. In other embodiments the wrap string 204 can be made of natural materials such as silk or gut, or synthetic materials such as nylon.

The wrap string 204 of a wound string can be shaped with any desired cross-sectional shape, such as a circular or oval cross-section, a rectangular cross-section, a polygonal cross-section, or any other cross-sectional shape. The wrap string 204 can be wrapped around the core string 202 to substantially cover the exterior surface of the core string 202. In some embodiments a wound string can be roundwound, wherein the wrap string 204 has a substantially circular cross-section and the exterior surface of the string 102 has grooves between adjacent spiral loops of the wrap string 204, as shown in FIG. 2. In other embodiments a wound string can be flatwound, wherein the wrap string 204 can have a substantially rectangular cross-section, such that outer-facing substantially flat surfaces of the wrap string 204 lead to the exterior surface of the wound string being substantially flat. In still other embodiments a wound string can be halfwound, ground wound, or pressure wound, wherein after the wrap string 204 has been wound around the core string 202, the outer-facing surface of the wrap string 204 is polished, ground, or pressed until the exterior surface of the wound string 102 is substantially flat. In yet other embodiments, the string 102 can be formed or wrapped to provide the exterior surface of the string 102 with any other desired texture or pattern.

Returning to FIG. 1, at least the exterior surface of the string 102 can be ionically and/or covalently bonded with a nano-polymer substance 104. In some embodiments the nano-polymer substance 104 can be silicone-based. In other embodiments the nano-polymer substance 104 can be carbon-based or be any other type of nano-polymer substance 104.

The nano-polymer substance 104 can comprise a plurality of nano-particles between 1 and 100 nanometers in size. In some embodiments, the size and/or shape of the nano-particles can cause the nano-polymer substance 104 to be hydrophobic and/or oleophobic, such that elements bonded with the nano-polymer substance 104 can substantially repel water and/or oils.

In some embodiments, the nano-polymer substance 104 can be bonded with, and substantially cover, the outward-facing surface of the string 102. By way of a non-limiting example, in a wound string the nano-polymer substance 104 can substantially cover the outward-facing surfaces of the wrap string 204 when it is wound around the core string 202, including locations within notches or grooves between adjacent sections of the spiral-wrapped wrap string 204. In some embodiments the nano-polymer substance 104 can be bonded with surfaces of a core string 202 as well as surfaces of a wrap string 204.

In some embodiments the nano-polymer substance 104 can be sprayed onto the exterior surface of one or more components of a string 102, such that the nano-polymer substance can bond with the components of the string 102. In other embodiments one or more components of a string 102 can be dipped or otherwise immersed in the nano-polymer substance 104 such that the nano-polymer substance 104 is applied to the string component's exterior surface and can bond with the string component. In still other embodiments, the nano-polymer substance 104 can be brushed or rolled onto one or more components of the string 102.

Figure 3:
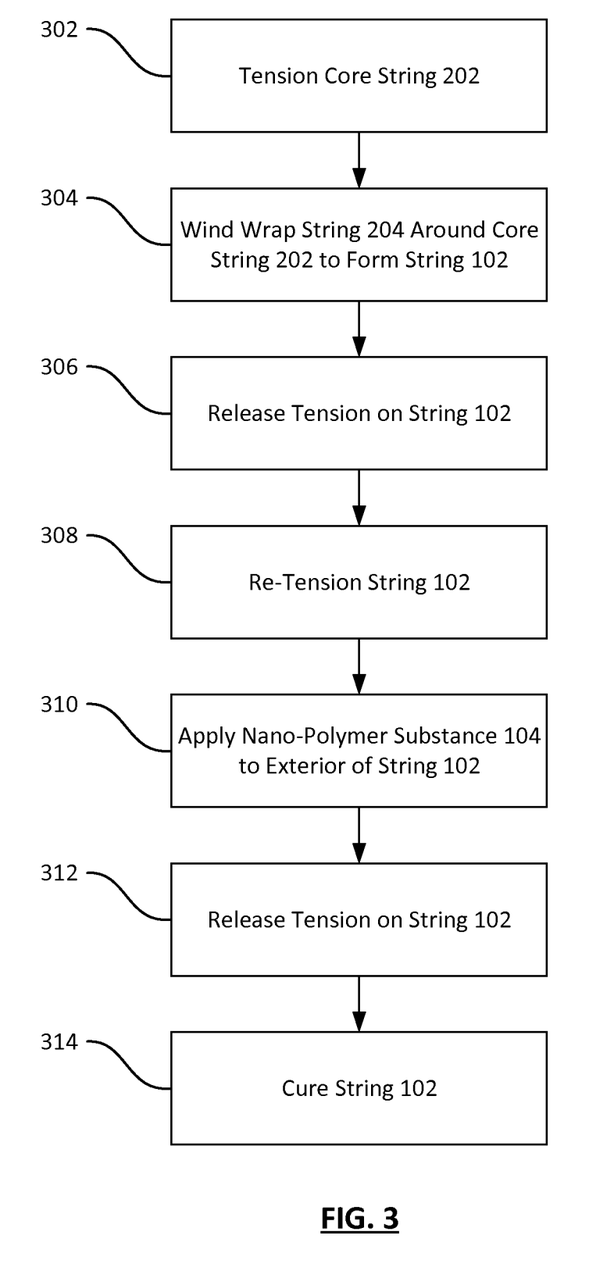
FIG. 3 depicts a first exemplary method for manufacturing a nano-polymer bonded musical instrument string.

FIG. 3 depicts a first method for manufacturing a nano-polymer bonded musical instrument string 100.

At step 302, a core string 202 can be tensioned such that the core string 202 is substantially straight. In some embodiments, a length of core string 202 can be uncoiled from a spool, and pulled to tension the uncoiled portion. In other embodiments a length of core string 202 can be pre-cut, and can be pulled in opposite directions from both ends or be anchored at one end and pulled from the opposing end. In some embodiments, mechanical grips or anchors can selectively hold one or both ends of the core string 202 and pull the core string 202 until it is tensioned and straight. In some embodiments a terminating component, such as a ball end, can be coupled with one or both ends of the core string 202 such that mechanical grips or anchors can pull on the terminating component to tension the core string 202.

At step 304, the wrap string 204 can be wrapped around the tensioned core string 202 to form a wound string. The wrap string 204 can be wrapped at an angle relative to the longitudinal axis of the tensioned core string 202, such that the wrap string 204 spirals around the exterior of the core string 202 along its length and substantially covers the exterior surface of the tensioned core string 202 to form the string 102. By way of a non-limiting example, in some embodiments mechanical grips or anchors can selectively hold one end of a wrap string 204 proximate to an end of the tensioned core string 202, and a spool can rotate around the tensioned core string 202 while moving along its length and unspooling wrap string 204 to spiral the wrap string 204 around the core string 202. By way of another non-limiting example, in other embodiments mechanical grips or anchors can selectively hold one end of a wrap string 204 proximate to an end of the tensioned core string 202, and mechanical grips or anchors can rotate the tensioned core string 202 while a spool moves linearly along the core string's length and unspools wrap string 204, thereby spiraling the wrap string 204 around the core string 202.

In some embodiments, tension on the string 102 can be released at step 306. By way of a non-limiting example, in embodiments in which a length of core string 102 was uncoiled from a spool and pulled from one end to tension it while wrap string 204 was spiraled around it in step 304, the length of core string 102 can be cut from the spool to release its tension. In some of these embodiments, after the length of core string 102 is cut a terminating element such as a ball end can be coupled with one or both ends of the string 102.

In some embodiments, when tension on the string was released during step 306, the string 102 can be later re-tensioned at step 308 using methods similar to those described in step 302. By way of a non-limiting example, manufacturing of a string 102 via steps 302 through 306 can occur at one location, and after step 306 the string 102 can be shipped to another location to be re-tensioned at step 308 and bonded with nano-polymer substance 104 at step 310. By way of another non-limiting example, tension on a string 102 can be released at step 306, such that the string 102 can be stored until such time as steps 308 and/or 310 occur.

In alternate embodiments, steps 306 and 308 can be skipped, and the string 102 can remain tensioned after step 304 so that the nano-polymer substance 104 can be applied to the tensioned string 102 during step 310.

Figure 4:
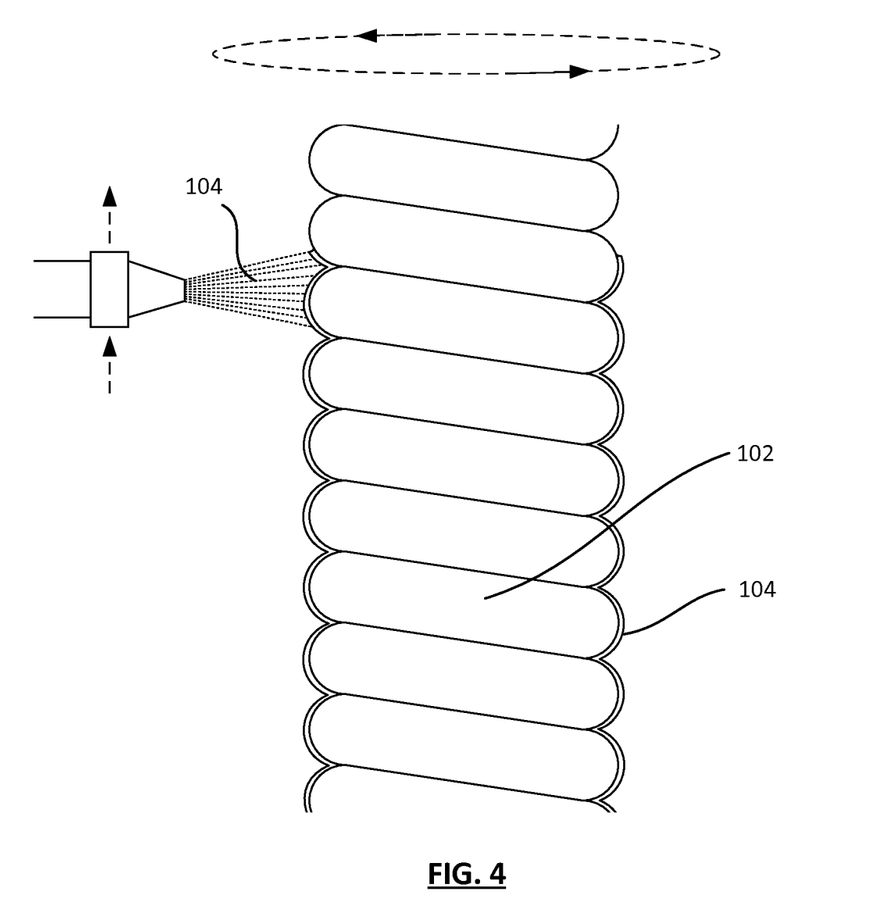
FIG. 4 depicts a nozzle spraying a nano-polymer substance on a wound string as the wound string is rotated about its longitudinal axis.

At step 310, the nano-polymer substance 104 can be applied to the exterior surface of the string 102, to form the nano-polymer bonded musical instrument string 100. In some embodiments, the nano-polymer substance 104 can be sprayed on the string 102 by a nozzle that moves linearly along the length of the tensioned string 102 as the string 102 is rotated about its longitudinal axis, as shown in FIG. 4. In other embodiments, the nano-polymer substance 104 can be sprayed on the string 102 by a nozzle that moves in a spiral around the tensioned string 102 along its length. In some embodiments, the nozzle's liquid pressure, the nozzle's air pressure for atomization, the nozzle's spray pattern, the nozzle movement speed, and/or the rotational speed of the string 102 or nozzle can be mechanically and/or computer-controlled or regulated.

In alternate embodiments a tensioned or untensioned string 102 can be immersed in the nano-polymer substance 104 to cover its exterior surface with the nano-polymer substance 104. In still other embodiments the nano-polymer substance 104 can be brushed and/or rolled onto the string 102.

In some embodiments in which the nano-polymer substance 104 was applied to a tensioned string 102, the tension can be released at step 312.

At step 314, the nano-polymer bonded musical instrument string 100 can be cured for a period of time ranging from minutes to weeks or months before the nano-polymer bonded musical instrument string 100 is shipped or used. During the curing time, the nano-polymer substance 104 can form a covalent and/or ionic bond with material in the string 102.

Figure 5:
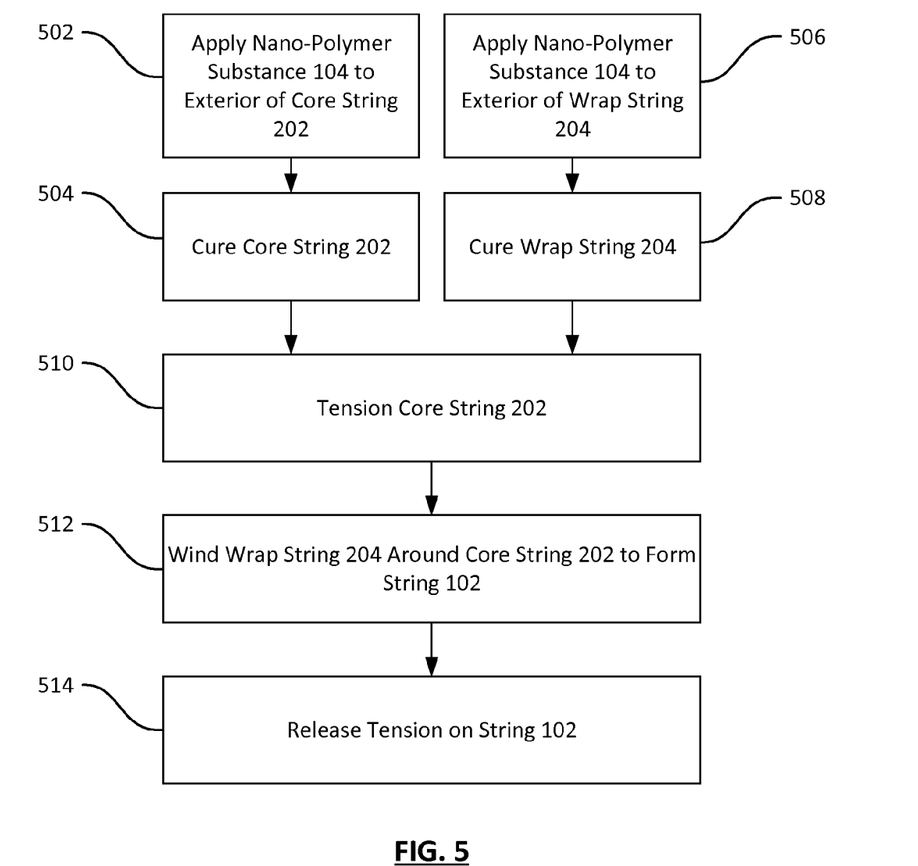
FIG. 5 depicts a second exemplary method for manufacturing a nano-polymer bonded musical instrument string.

FIG. 5 depicts a second method for manufacturing a nano-polymer bonded musical instrument string 100.

At step 502, a nano-polymer substance 104 can be applied to the exterior of a core string 202. The nano-polymer substance 104 can be applied to a core string 202 using any method, such as the methods of applying the nano-polymer substance 104 to a wound string described above with respect to FIG. 3. By way of a non-limiting example, the core string 202 can be tensioned and rotated while a nozzle moves along the length of the tensioned core string 202 to spray the nano-polymer substance 104 on the exterior of the core string 202.

In some embodiments the core string 202 can be cured for a period of time ranging from minutes to weeks or months during step 504 before moving to step 510. During the curing time, the nano-polymer substance 104 can form a covalent and/or ionic bond with material in the core string 202. In other embodiments step 510 can begin before the core string 202 is fully cured, and the string 102 can be allowed to cure for a period of time after a wrap string 204 has been wound around the core string 202 during step 512. At step 506, a nano-polymer substance 104 can be applied to the exterior of a wrap string 204. The nano-polymer substance 104 can be applied to a wrap string 204 using any method, such as the methods of applying the nano-polymer substance 104 to a wound string described above with respect to FIG. 3. By way of a non-limiting example, the wrap string 204 can be tensioned and rotated while a nozzle moves along the length of the tensioned wrap string 204 to spray the nano-polymer substance 104 on the exterior of the wrap string 204.

In some embodiments the wrap string 204 can be cured for a period of time ranging from minutes to weeks or months during step 508 before moving to step 510. During the curing time, the nano-polymer substance 104 can form a covalent and/or ionic bond with material in the wrap string 204. In other embodiments step 510 can begin before the wrap string 204 is fully cured, and the string 102 can be allowed to cure for a period of time after the wrap string 204 has been wound around a core string 202 during step 512.

At step 510, the core string 510 can be tensioned such that the core string 202 is substantially straight, as described above with respect to FIG. 3. By way of a non-limiting example, the core string 202 can be pulled in opposite directions from both ends or be anchored at one end and pulled from the opposing end. In some embodiments, mechanical grips or anchors can selectively hold one or both ends of the core string 202 and pull the core string 202 until it is tensioned and straight.

At step 512, the wrap string 204 can be wrapped around the tensioned core string 202 to form a wound string, as described above with respect to FIG. 3. By way of a non-limiting example, the wrap string 204 can be wrapped at an angle relative to the longitudinal axis of the tensioned core string 202, such that the wrap string 204 spirals around the exterior of the core string 202 along its length and substantially covers the exterior surface of the tensioned core string 202 to form the string 102. At step 514, the tension on the string 102 can be released.

Figure 6:
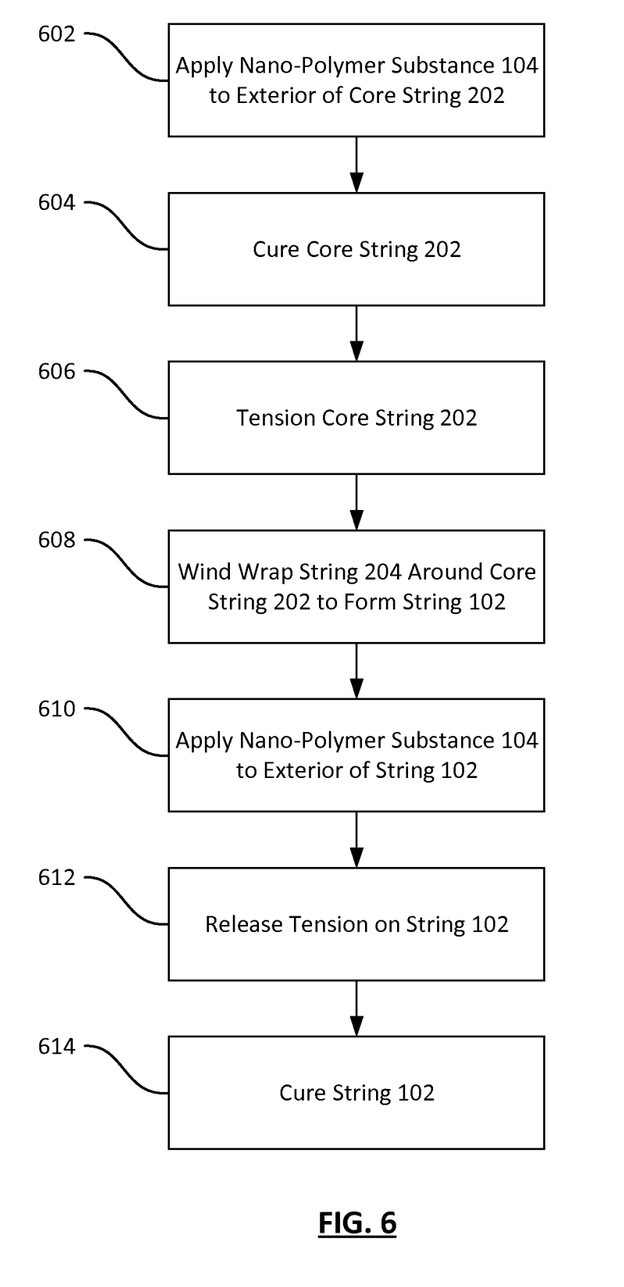
FIG. 6 depicts a third exemplary method for manufacturing a nano-polymer bonded musical instrument string.

FIG. 6 depicts a third method for manufacturing a nano-polymer bonded musical instrument string 100.

At step 602, a nano-polymer substance 104 can be applied to the exterior of a core string 202. The nano-polymer substance 104 can be applied to a core string 202 using any method, such as the methods of applying the nano-polymer substance 104 to a wound string described above with respect to FIG. 3. By way of a non-limiting example, the core string 202 can be tensioned and rotated while a nozzle moves along the length of the tensioned core string 202 to spray the nano-polymer substance 104 on the exterior of the core string 202.

In some embodiments the core string 202 can be cured for a period of time ranging from minutes to weeks or months during step 604 before moving to step 606. In other embodiments step 606 can begin before the core string 202 is fully cured.

At step 606 the core string 202 can be tensioned such that the core string 202 is substantially straight, as described above with respect to FIG. 3, if the core string 202 did not remain tensioned after step 602. By way of a non-limiting example, the core string 202 can be pulled in opposite directions from both ends or be anchored at one end and pulled from the opposing end. In some embodiments, mechanical grips or anchors can selectively hold one or both ends of the core string 202 and pull the core string 202 until it is tensioned and straight.

At step 608, the wrap string 204 can be wrapped around the tensioned core string 202 to form a wound string, as described above with respect to FIG. 3. By way of a non-limiting example, the wrap string 204 can be wrapped at an angle relative to the longitudinal axis of the tensioned core string 202, such that the wrap string 204 spirals around the exterior of the core string 202 along its length and substantially covers the exterior surface of the tensioned core string 202 to form the string 102. At step 612, the tension on the string 102 can be released.

At step 614, the nano-polymer bonded musical instrument string 100 can be cured for a period of time ranging from minutes to weeks or months before the nano-polymer bonded musical instrument string 100 is shipped or used. During the curing time, the nano-polymer substance 104 can form a covalent and/or ionic bond with material in the string 102.

In use, a nano-polymer bonded musical instrument string 100 can be installed on a musical instrument to be played. The nano-polymer substance 104 can improve the string's resistance to oxidation, corrosion, and/or other types of degradation. As the nano-polymer substance 104 can form a covalent and/or ionic bond with the string 102, it can be less susceptible to peeling than conventional musical instrument string coatings. Test results have shown that when used in a musical instrument, nano-polymer bonded musical instrument strings 100 can produce an improved sound tone when compared to conventionally coated and uncoated musical instrument strings.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A musical instrument string, comprising:
   a wound string having a core string and a wrap string wrapped around the exterior of said core string in a spiral pattern; and
   a nano-polymer substance covalently and/or ionically bonded with the exterior surface of said wound string.

2. The musical instrument string of claim 1, wherein said nano-polymer substance is silicone-based.

3. The musical instrument string of claim 1, wherein said nano-polymer substance is hydrophobic.

4. The musical instrument string of claim 1, wherein said nano-polymer substance is oleophobic.

5. A method of manufacturing a nano-polymer bonded musical instrument string, comprising:
   providing a wound string comprising a core string and a wrap string spiraled around said core string;
   applying a nano-polymer substance to the exterior surface of said wound string, such that said nano-polymer substance forms a covalent and/or ionic bond with said wound string; and
   curing said wound string for a period of time.

6. The method of claim 5, wherein providing said wound string comprises tensioning said core string and wrapping said wrap string around said core string in a spiral pattern.

7. The method of claim 5, wherein applying said nano-polymer substance to the exterior surface of said wound string comprises:
   tensioning said wound string; and
   spinning said wound string about its longitudinal axis and spraying said nano-polymer substance from a nozzle moving along the length of said wound string.

8. The method of claim 5, wherein applying said nano-polymer substance to the exterior surface of said wound string comprises dipping said wound string in said nano-polymer substance.

9. The method of claim 5, wherein said nano-polymer substance is silicone-based.

10. The method of claim 5, wherein said nano-polymer substance is hydrophobic.

11. The method of claim 5, wherein said nano-polymer substance is oleophobic.

12. A method of manufacturing a nano-polymer bonded musical instrument string, comprising:
   providing a core string;
   providing a wrap string;
   applying a nano-polymer substance to the exterior surface of said core string, such that said nano-polymer substance forms a covalent and/or ionic bond with said core string;
   applying said nano-polymer substance to the exterior surface of said wrap string, such that said nano-polymer substance forms a covalent and/or ionic bond with said wrap string;
   tensioning said core string such that said core string is substantially straight; and
   wrapping said wrap string around said core string in a spiral pattern to form a wound string.

13. The method of claim 12, wherein applying said nano-polymer substance to the exterior surface of said core string comprises:
   tensioning said core string; and
   spinning said core string about its longitudinal axis and spraying said nano-polymer substance from a nozzle moving along the length of said core string.

14. The method of claim 12, wherein applying said nano-polymer substance to the exterior surface of said core string comprises dipping said core string in said nano-polymer substance.

15. The method of claim 12, wherein applying said nano-polymer substance to the exterior surface of said wrap string comprises:
   tensioning said wrap string;
   spinning said wrap string about its longitudinal axis and spraying said nano-polymer substance from a nozzle moving along the length of said wrap string.

16. The method of claim 12, wherein applying said nano-polymer substance to the exterior surface of said wrap string comprises dipping said wrap string in said nano-polymer substance.

17. The method of claim 12, wherein said nano-polymer substance is applied to both said core string and said wrap string prior to wrapping said wrap string around said core string.

18. The method of claim 12, wherein said nano-polymer substance is applied to said core string prior to wrapping said wrap string around said core string, and said nano-polymer substance is applied to said wrap string after wrapping said wrap string around said core string.

\* \* \* \* \*